Patented Jan. 4, 1938

2,104,703

UNITED STATES PATENT OFFICE 2,104,703

METHOD FOR THE MANUFACTURE OF CHLOROFORM

Gerald H. Coleman, Bartholdt C. Hadler, and Edward C. Zuckermandel, Midland, Mich., assignors to The Dow Chemical Company, Midland, Mich., a corporation of Michigan No Drawing. Application February 13, 1936, Serial No. 63,734

9 Claims. (Cl. 260—165)

This invention concerns an improved method of manufacturing chloroform by reaction of carbon tetrachloride with iron and water. One of the commercial methods for manufacturing chloroform consists essentially in agitating a mixture of carbon tetrachloride, water, and finely divided iron, whereby the carbon tetrachloride is reduced and chloroform produced in accordance with the equation:—

$$2CCl_4 + 2H_2O + 2Fe \rightarrow FeCl_2 + Fe(OH)_2 + 2CHCl_3$$

This method involves certain disadvantages. For instance, the reaction is slow, and side reactions with formation of by-products, such as hexachloroethane and tetrachloroethylene, usually occur to a considerable extent.

An object of the invention is to provide an improved method of making chloroform by the above reaction, whereby the rate of reaction to produce chloroform may be materially increased. Other objects will be apparent from the following description of the invention.

We have discovered that the presence of certain metals, such as lead, copper, magnesium, antimony, and thallium and compounds of such metals accelerate the above mentioned reaction for the production of chloroform. We have further discovered that by employing such metal or metal compound in admixture with an ammonium salt as a catalyst in the reaction, the rate of reaction to produce chloroform not only is increased materially, but by-product formation is reduced. Such catalysts are materials which do not render the iron passive. The invention, then, consists in the improved method of manufacturing chloroform hereinafter fully described and particularly pointed out in the claims.

In manufacturing chloroform by our method, a mixture of carbon tetrachloride, water, finely divided iron, and a catalyst, preferably comprising lead, copper, or a compound of such metal, is agitated, preferably in a rotating horizontal cylindrical reactor partially filled with jacks, stones, or other loose objects. The reaction is usually carried out at temperatures between 15° and 50° C., but may be carried out at lower or higher temperatures if desired. Between 0.001 and 0.2 part by weight of the catalyst is preferably employed per part of carbon tetrachloride.

The reaction is usually carried out at atmospheric pressure, or slightly above, but may be carried out at lower or higher pressures if desired. For instance, it may be carried out under vacuum as described in U. S. Patent No. 1,311,329 so as to distill chloroform from the mixture as it is formed.

Agitation of the mixture under the conditions stated above is preferably continued until 0.4 chemical equivalent or more of inorganic chloride, e. g. 0.4 mole or more of hydrogen chloride, has been generated by the reaction per mole of carbon tetrachloride employed. The chloroform, unreacted carbon tetrachloride and by-products such as hexachloroethane and tetrachloroethylene are then distilled directly from the reaction mixture and purified by redistillation.

For the purpose of illustrating the invention, the following table gives the per cent increase in yield of chloroform based both on the carbon tetrachloride employed and on the carbon tetrachloride reacted, which is brought about by employing catalysts of the present type in the reaction between carbon tetrachloride, iron, and water. In testing each catalyst two comparative experiments were carried out, one in the presence of the catalyst and the other in the absence of the same but under otherwise identical conditions. In the experiment without a catalyst a mixture of 1 part by weight of iron, 2 parts of carbon tetrachloride, and 2.4 parts of water was maintained at a temperature of 30° C. and agitated continuously for 24 hours. The mixture was permitted to settle into an upper aqueous layer and a lower organic layer. The latter was separated from the aqueous layer and distilled to obtain the chloroform product and unreacted carbon tetrachloride. The experiment using a catalyst was carried out in identical manner except that the catalyst shown in the table was added to the initial reaction mixture in the amount stated, in parts by weight.

Table

| Catalysts | | Percent increase in yield of CHCl$_3$ on CCl$_4$ employed | Percent increase in yield of CHCl$_3$ on CCl$_4$ reacted |
|---|---|---|---|
| Kind | Parts by weight | | |
| Copper powder | 0.009 | 47 | −13 |
| Lead shot | 0.009 | 46 | 22 |
| Lead chloride | 0.0009 | 77 | 7 |
| Lead sulphate | 0.0009 | 65 | 6 |
| PbO | 0.0009 | 95 | 10 |
| Pb$_3$O$_4$ | 0.0009 | 91 | 10 |
| Pb(NO$_3$)$_2$ | 0.0009 | 58 | 14 |
| Pb(C$_2$H$_3$O$_2$)$_2$ | 0.0009 | 61 | 7 |
| Pb<br>(NH$_4$)$_2$SO$_4$ | 0.009<br>0.009 | 44 | 17 |
| PbO<br>(NH$_4$)$_2$SO$_4$ | 0.0009<br>0.009 | 57 | 34 |
| PbO<br>NH$_4$Cl | 0.0009<br>0.009 | 70 | 32 |

Other metals and metal compounds and mixtures of such metals or metal compounds with other ammonium salts may be employed as catalysts in the present process. For instance, copper sulphate, copper chloride, lead bromide, lead tartrate, thallium chloride, magnesium, antimony, or mixtures of any of said materials with ammonium salts, such as ammonium bromide, ammonium acetate, ammonium tartrate, etc., can be employed as catalysts. The lead- and copper-containing catalysts are generally more effective than the other catalysts hereinbefore mentioned and insofar as we are aware, any catalyst belonging to the group consisting of lead, copper, lead compounds, copper compounds and mixtures of said metals or metal compounds with ammonium salts can be employed successfully to increase the rate at which carbon tetrachloride is reduced with iron and water to produce chloroform.

Other modes of applying the principle of the invention may be employed instead of those explained, change being made as regards the method herein disclosed, provided the step or steps stated by any of the following claims or the equivalent of such stated step or steps be employed.

We, therefore, particularly point out and distinctly claim as our invention:—

1. In a method of making chloroform, the step which consists in reacting carbon tetrachloride with water and finely divided iron in the presence of a catalyst containing lead as an essential ingredient.

2. In a method of making chloroform, the step which consists in reacting carbon tetrachloride with water and finely divided iron in the presence of finely divided lead.

3. In a method of making chloroform, the step which consists in reacting carbon tetrachloride with water and finely divided iron in the presence of a catalytically active lead compound.

4. In a method of making chloroform, the step which consists in reacting carbon tetrachloride with water and finely divided iron in the presence of a lead oxide.

5. In a method of making chloroform by reaction of carbon tetrachloride with iron and water, the step which consists in carrying the reaction out in the presence of a catalyst containing, as an essential ingredient, a substance selected from the class consisting of lead and catalytically active lead compounds, copper and catalytically active copper compounds and mixtures thereof with ammonium salts.

6. In a method of making chloroform, the step which consists in reacting carbon tetrachloride with water and finely divided iron in the presence of lead and an ammonium salt.

7. In a method of making chloroform, the step which consists in reacting carbon tetrachloride with water and finely divided iron in the presence of a catalytically active lead compound and an ammonium salt.

8. In a method of making chloroform, the step which consists in reacting carbon tetrachloride with water and finely divided iron in the presence of a lead oxide and an ammonium salt.

9. In a method of making chloroform, the step which consists in agitating a mixture of carbon tetrachloride, water, finely divided iron, and a catalyst containing, as an essential ingredient, a substance selected from the class consisting of lead and catalytically active lead compounds, copper and catalytically active copper compounds and mixtures thereof with ammonium salts.

GERALD H. COLEMAN.
BARTHOLDT C. HADLER.
EDWARD C. ZUCKERMANDEL.